(12) United States Patent
Polk et al.

(10) Patent No.: US 7,764,945 B2
(45) Date of Patent: Jul. 27, 2010

(54) METHOD AND APPARATUS FOR TOKEN DISTRIBUTION IN SESSION FOR FUTURE POLLING OR SUBSCRIPTION

(75) Inventors: James M. Polk, Colleyville, TX (US); Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1176 days.

(21) Appl. No.: 11/371,606

(22) Filed: Mar. 8, 2006

(65) Prior Publication Data

US 2007/0211867 A1    Sep. 13, 2007

(51) Int. Cl.
*H04M 11/04* (2006.01)
(52) U.S. Cl. ................... 455/404.1; 379/90.01
(58) Field of Classification Search ............... 379/37–52
See application file for complete search history.

(56) References Cited

U.S. PATENT DOCUMENTS

| | | | | |
|---|---|---|---|---|
| 6,366,577 | B1 * | 4/2002 | Donovan | 370/352 |
| 7,130,286 | B2 * | 10/2006 | Koodli et al. | 370/331 |
| 2002/0184539 | A1 * | 12/2002 | Fukuda et al. | 713/202 |
| 2002/0188581 | A1 | 12/2002 | Fortin et al. | |
| 2004/0104097 | A1 * | 6/2004 | Ngee | 194/210 |
| 2004/0203574 | A1 * | 10/2004 | Chin et al. | 455/404.1 |
| 2005/0079866 | A1 * | 4/2005 | Chen et al. | 455/435.1 |
| 2006/0177056 | A1 * | 8/2006 | Rostin et al. | 380/46 |

OTHER PUBLICATIONS

Cheng, R., et al., "Using Uncertainty to Provide Privacy-Preserving and High-Quality Location-Based services," Workshop on Location Systems Privacy and Control, Moble HCI 04, 2004, 4 pages, [online] [retrieved on Nov. 14, 2006] Retrieved from the Internet: <URL: http://www.cs.purdue.edu/homes/sunil/frames/pub/privacy.pdf>.

(Continued)

*Primary Examiner*—Curtis Kuntz
*Assistant Examiner*—Maria El-Zoobi
(74) *Attorney, Agent, or Firm*—Tucker Ellis & West LLP

(57) ABSTRACT

A system and a method are disclosed for authenticating a subsequent callback from a public safety answering point (PSAP) in response to a user agent's initial emergency call. In one embodiment, the user agent forwards a token to the PSAP during the initial call, and the PSAP returns the token during callback. The PSAP is authenticated when the forwarded and returned tokens match. In another embodiment, the user agent encrypts a token using a Public Key Infrastructure and forwards the encrypted token to the PSAP. The PSAP decrypts the token and, upon callback, includes a signed digital certificate based on the token. The user agent authenticates the PSAP when the decrypted digital certificate matches the originally sent token. In yet another embodiment, the user agent forwards a first token to the PSAP. Upon callback, the user agent forwards a second token to the PSAP. The PSAP performs a function on the pair of received tokens and forward the result to the user agent. The user agent performs the same function on the same tokens to obtain a local result. The user agent authenticates the PSAP when the local and forwarded results match.

24 Claims, 4 Drawing Sheets

OTHER PUBLICATIONS

International Search Report and Written Opinion, PCT/US2006/025219, Nov. 27, 2006, 12 pages.

Handley, M., et al., "SIP: Session Initiation Protocol," Network Working Group, Mar. 1999, pp. 1-153.

Krawczyk, H., et al., "HMAC: Keyed-Hashing for Message Authentication," Network Working Group, Feb. 1997, pp. 1-11.

Rosen, B., "Emergency Call Information in the Domain Name System", Sipping, Internet-Draft, Jul. 16, 2004, (expires Jan. 14, 2005), pp. 1-20.

Rosen, B., et al., "NENA Requirements for Emergency Call Processing", Ecrit, Internet-Draft, Feb. 15, 2005, (expires Aug. 19, 2005), pp. 1-14.

Rosenberg, J., "Obtaining and Using Globally Routable User Agent (UA) URIs (GRUU) in the Session Initiation Protocol (SIP)," SIPP, Internet-Draft, Oct. 20, 2005, pp. 1-41.

Rosenberg, J., "Request Authorization through Dialog Identification in the Session Initiation Protocol (SIP)," SIPP, Internet-Draft, Apr. 4, 2005, pp. 1-15.

Rosenberg, J., et al., "SIP: Session Initiation Protocol," Network Working Group, Jun. 2002, pp. 1-269.

Schulzrinne, H., "Emergency Calling for VoIP," Columbia University, Jan. 2004, pp. 1-6.

Schulzrinne, H., "Enterprise SIP," Avaya, Columbia Computer Science, Mar. 29, 2001, pp. 1-10.

Schulzrinne, H., et al., "Policy Rules for Disclosure and Modification of Geographic Information," GEOPRIV, Internet-Draft, Oct. 20, 2003, pp. 1-41.

Willis, D., et al., "SIP Cookies," SIP, Internet-Draft, Jul. 2001, pp. 1-9.

* cited by examiner

METHOD AND APPARATUS FOR TOKEN DISTRIBUTION IN SESSION FOR FUTURE POLLING OR SUBSCRIPTION

CROSS REFERENCE TO RELATED APPLICATIONS

This application is related to U.S. patent application Ser. No. 11/182,548, filed on Jul. 15, 2005, entitled "Efficiently Bounding the Location of a Mobile Communications Device", the contents of which are incorporated by reference herein.

FIELD OF THE INVENTION

The present invention generally relates to the field of emergency call service, and more specifically, to authenticating a call from a public safety answering point to an emergency caller.

BACKGROUND

When a public communications device such as a cell phone places a 911 or other emergency call, a facility known as a Public Safety Answering Point, or PSAP, responds to the call. The PSAP is responsible for determining the nature of the emergency and engaging the appropriate local public safety service, e.g., police, fire etc. Each PSAP serves a predefined geographic area, and a state or province may include many PSAPs. Thus, when an emergency call is placed by a user agent, that is, the person placing the call, the appropriate PSAP must be quickly determined so that the necessary emergency services may be timely called to action. This PSAP in turn must then determine the location of the user agent in order to render emergency service.

When initiating an emergency call, the user agent will likely embed its surface coordinate or civic formatted location within the call routing message. If the user agent calls from a mobile device such as a cell phone, however, there is a possibility that the user agent's location will change during the time required for the emergency service to respond. Thus, the PSAP may attempt to call the user agent back after termination of the original emergency call, to request an update in the user agent's location. However, the user agent may have directed calls from unknown parties such as the PSAP to a forwarding number or to voicemail. Moreover, the user agent may not trust a previously-unknown entity such as a PSAP. For example, the user agent may suspect that the PSAP is a malicious party who may be attempting to hijack the call flow. Thus, the user agent may decline to furnish its location or other confidential information unless it can authenticate the PSAP.

From the above, there is a need for a system and method to authenticate a call from a PSAP back to a user agent following an emergency call.

BRIEF DESCRIPTION OF THE DRAWINGS

The Figures and the following description relate to preferred embodiments of the present invention by way of illustration only. It is noted that wherever practicable similar or like reference numbers may be used in the figures and may indicate similar or like functionality. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

In the following, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of electronic communications signals. These algorithmic descriptions and representations are the means used by those skilled in the art to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electromagnetic signals capable of being transmitted, received, combined, compared, and otherwise manipulated. It has proven convenient at times, principally for reasons of common usage, to refer to these signals as calls, invitations, requests, replies, answers, acknowledgements or the like.

Figure 1:
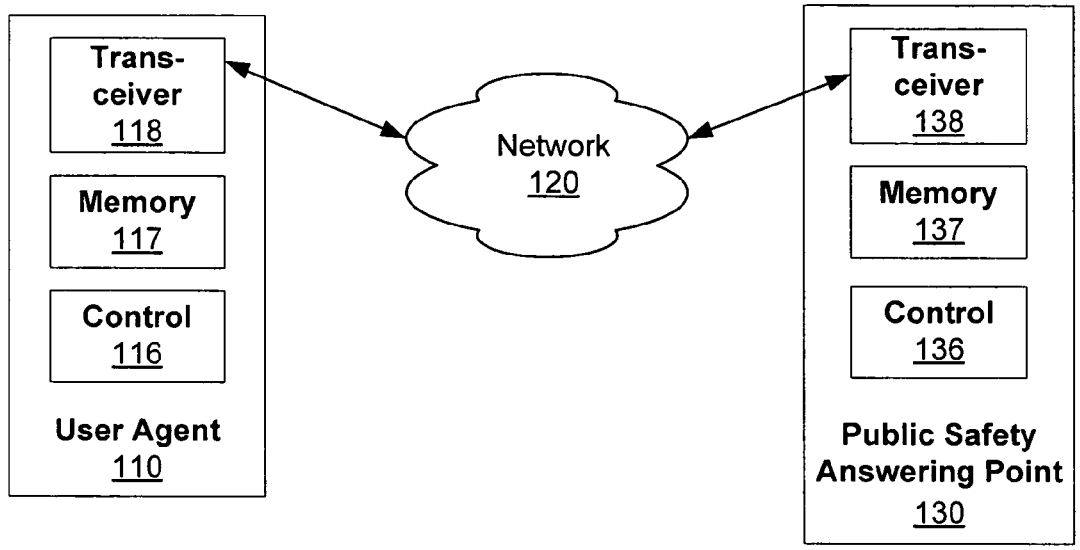
FIG. 1 is a schematic illustration of an emergency communication system.

FIG. 1 is a schematic illustration of a communication system 100. A user agent's communications device 110 communicates with a network 120 by means of an associated network infrastructure. Communications device 110 may be, e.g., a cellular handset, a personal digital assistant (PDA) or other device. Communication may take place according to any of number of protocols, including second-generation cellular ("2G"), 3G, voice-over-internet protocol (VoIP), or other appropriate schemes. Communications device 110 and network 120 may exchange information corresponding to a number of applications, including, e.g., voice, text messaging, still and motion pictures, and so on. Network 120 may be either a closed, e.g., proprietary network, or an open network such as the Internet. In the following discussion, references made variously to user agent 110 and to communications device 110 are understood to mean communications initiated by the user agent's communications device, either as a result of actions of the user agent, or as a result of automatic processes within the user agent's communications device.

Communications device 110 also receives signals from network 120. Communications device 110 includes a control module or functionality 116, which may be implemented according to any of a variety of techniques that are well-known in the art. Such techniques include software-, firmware- or hardware-based techniques, or combinations thereof. Communications device 110 can also include a memory module 117 for storing operational parameters such as phone numbers, program code, tokens as described below, and so on. Communications device 110 also includes a transceiver module or functionality 118, e.g., comprising a transmitter module and receiver module. The transmitter module is configured to transmit information to network 120 based on the applications of interest via an appropriate communications channel. Similarly, the receiver module is configured to receive information transmitted by network 120.

Operation of transceiver module 118 may be managed by control module 116. In at least one embodiment, control module 116 and transceiver module 118 operate to establish communications with one or more Public Safety Answering Points (PSAPs) 130. In a mobile communications scenario, the pertinent PSAPs collectively accommodate the mobile service provision area, and dispatch emergency calls (e.g., 911) made by mobile users to the appropriate public safety authorities. Communications device 110 may alternately access a PSAP via a proxy (not shown). A PSAP 130 also includes a control module 136, memory module 137 and a transceiver module 138. These elements are analogous, but not necessarily identical, to control, memory and transceiver modules 116, 117 and 118, respectively.

Figure 2:
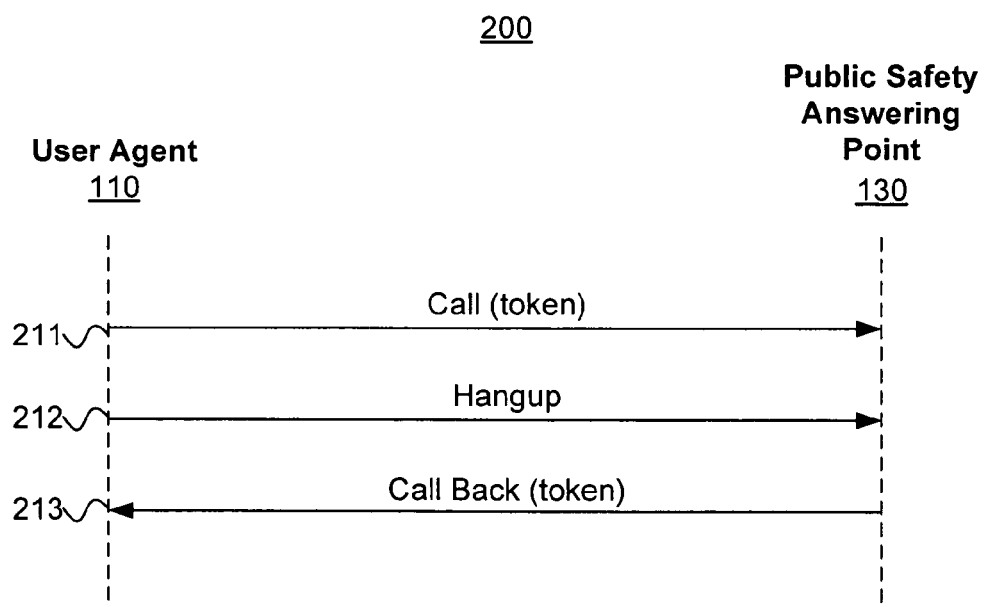
FIG. 2 illustrates an exemplary message sequence within an emergency communications system.

The present invention includes a system and a method for a user agent to authenticate a PSAP upon a callback from the PSAP 130. The authentication confirms that the PSAP was the party that the user agent contacted when first reporting the emergency. This is illustrated by the message sequence of FIG. 2. The user agent 110 sends 211 a communication to a PSAP 130, thus initiating a connection with the PSAP 130. The communication includes a token that may comprise a variety of types of information, as will be described below. The user agent 110 subsequently terminates 212 the call (e.g., terminates the connection) by hanging up or otherwise ending the call. Alternately, the call may terminate 212 as a consequence of a loss of signal, e.g., a dropped cellular call.

PSAP 130 subsequently calls 213 the user agent 110 back, thus initiating another connection. Upon calling back 213, the PSAP includes the user's token or some representation or function of the token. User agent 110 authenticates the PSAP 130 if it determines that the token received when PSAP 130 calls back 213 matches, e.g., is the same as, or is a valid function of, the token sent when the user agent 110 initially called 211.

The operations described above in concept may be adapted to conform to telecommunications protocols, for example, the Session Initiation Protocol (SIP). SIP is an application-layer control protocol that can establish, modify and terminate communications such as multimedia sessions or calls. SIP can also invite parties to communications sessions. SIP supports various aspects of establishing and terminating communications sessions, including i) determining the end system to be used for communication; ii) determining the media and media parameters to be used; iii) determining the willingness of the called party to engage in communications; and iv) "ringing," e.g., establishment of call parameters at both a called and a calling party.

A successful SIP invitation generally comprises two requests, INVITE followed by ACK (Acknowledge). The INVITE request asks the callee to join a particular conference or establish a two-party conversation. After the callee has agreed to participate in the call, the caller confirms that it has received that response by sending an Acknowledge request. If the caller no longer wants to participate in the call, it sends a BYE (Hangup) request instead of an Acknowledge. A description of the SIP protocol can be found in the Internet Engineering Task Force Request for Comment (RFC) 3261, which is incorporated by reference herein in its entirety. The invention is not limited to SIP, and may be incorporated into any appropriate communication protocol.

According to one embodiment, the user agent 110 includes a token, for example a random number, in the initial call setup message. If the user agent 110 terminates the original call, the PSAP 130 may call the user agent back. Upon doing so, the PSAP 130 includes the token as a means of validating the PSAP's identity. If the user agent 110 recognizes the received token as matching the token it originally sent, it can authenticate the PSAP 130 as the party it originally contacted when it placed the original emergency call. The user agent 110 can then elect to connect and converse with PSAP 130.

Figure 3:
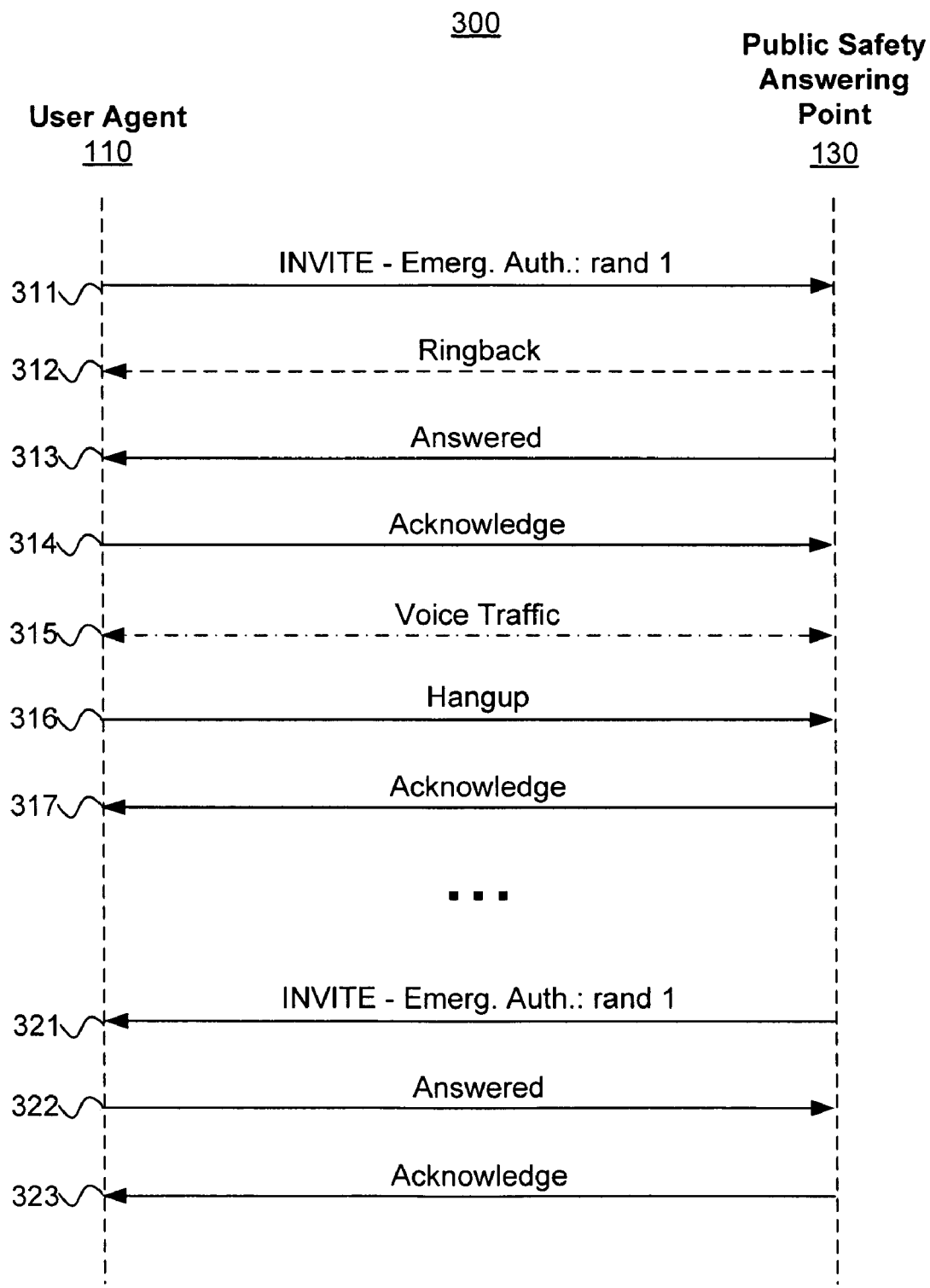
FIG. 3 illustrates one method of authenticating a call from a Public Safety Answering Point (PSAP) according to one embodiment of the present invention.

An exemplary message sequence according to the SIP protocol for this embodiment is illustrated in FIG. 3. The user agent 110 sends 311 a communications message such as an INVITE—Emergency Authorization (Emerg. Auth.) to PSAP 130. This message includes a token chosen by user agent 110, such as a random number, e.g., (rand 1). Such a random number should be cryptographically random and of sufficient size to provide adequate security. For example, 128 bits may be adequate for some embodiments. PSAP 130 then optionally sends 312 a ringback. Ringback is the signaling tone produced by the control module 116 or transceiver module 118, indicating to user agent 110 that PSAP 130 is being alerted (ringing). PSAP 130 then sends 313 an Answered message indicating that it has answered the call. User agent 110 then sends 314 an Acknowledge message to confirm that it received the Answered message. Voice traffic then commences 315 between the user agent 110 and the PSAP 130. User agent 110 can then send 316 a Hangup message to PSAP 130, thereby terminating the connection. After this, PSAP 130 can send 317 an Acknowledge of the hangup. Termination of the connection can also be unintentional, such as from signal loss, power loss, or an inadvertent hang-up.

If PSAP 130 subsequently wishes to contact user agent 110, it sends 321 an INVITE message to user agent 110. This message includes a token that matches the token sent 311 by the user agent 110. For example, if the token sent by the user agent 110 was a random number, the PSAP may send the same random number back to the user agent 110. User agent 110 authenticates the PSAP 130 when if confirms that the token received from PSAP 130 matches the token that user agent 110 originally sent. In such case, user agent 110 sends 322 an Answered to PSAP 130, and PSAP 130 then sends 323 an Acknowledge back to user agent 110.

According to another embodiment, public key infrastructure (PKI) techniques are used. The user agent 110 encrypts a token such as the combination of a random number and a time, and includes the encrypted information in an initial call message. Encryption is preferably performed using the PSAP's public key. If the user agent 110 terminates the initial call, the PSAP 130 may call the user agent back. The PSAP 130 decrypts the encrypted token using the user agent's public key. Upon calling back, the PSAP 130 digitally signs the token using the PSAP's private key, and includes the resulting digital certificate within the callback message. The user agent 110 then authenticates the PSAP 130 by decrypting the received digital certificate using the PSAP's public key. Principles of PKI are well known in the art, and need not be elaborated herein.

Figure 4:
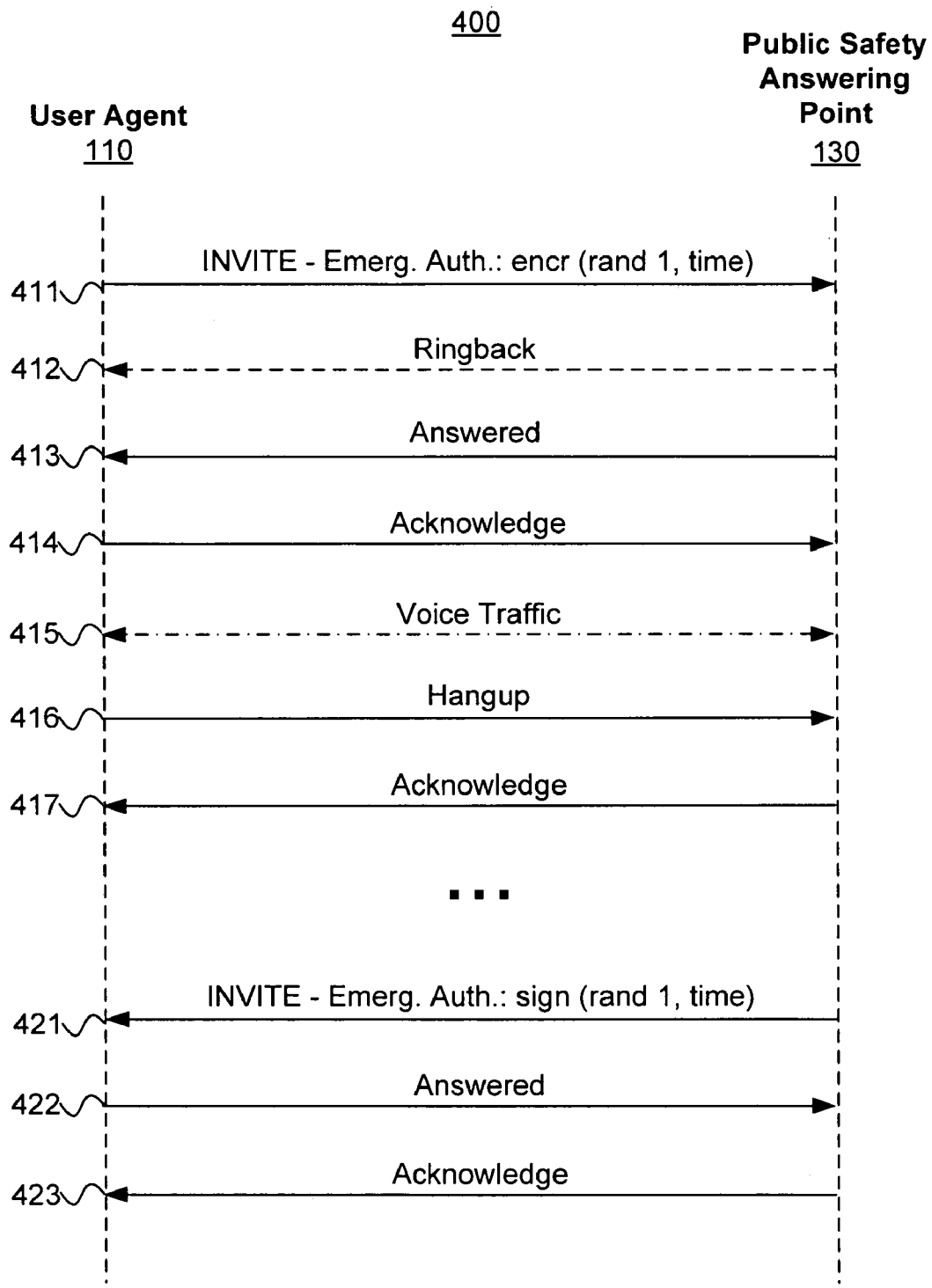
FIG. 4 illustrates another method of authenticating a call from a Public Safety Answering Point (PSAP) according to another embodiment of the present invention.

An exemplary messaging sequence according to SIP for this embodiment is illustrated in FIG. 4. The user agent 110 sends 411 a message such as an INVITE—Emerg. Auth. to PSAP 130. This message includes an encryption of a token chosen by user agent 110, such as the combination of a random number and a time, e.g., (rand 1, time). PSAP 130 then optionally sends 412 a ringback, as described above. PSAP 130 then sends 413 an Answered message indicating that it has answered the call. User agent 110 then sends 414 an Acknowledge message to confirm that it received the Answered message. Voice traffic then commences 415 between the user agent 110 and the PSAP 130. User agent 110 may then send 416 a Hangup message to PSAP 130, thereby terminating the connection. After this, PSAP 130 sends 417 an Acknowledge of the hangup/termination.

If PSAP 130 subsequently wishes to contact user agent 110, it decrypts the encrypted token sent 411 by user agent 110 to recover the token, e.g., (rand 1, time). Decryption is preferably performed using the PSAP's private key. PSAP 130 then sends 421 an INVITE message to user agent 110 that includes a signed digital certificate based on the recovered token and the PSAP's private key. According to the present example, the signed digital certificated would be based on the token (rand1, time). User agent 110 authenticates the PSAP 130 when it successfully decrypts the received digital certificate using the PSAP's public key. Following authentication, user agent 110 sends 422 an Answered to PSAP 130, and PSAP 130 then sends 423 an Acknowledge back to user agent 110.

According to yet another embodiment, the user agent 110 again includes a token, for example a random number and a time, in the initial call setup message. If the user agent terminates the call, the PSAP 130 calls the user agent back and initiates another connection. Following this, the user agent 110 forwards a second token, for example, a second random number, to the PSAP. The PSAP 130 applies a function such as a Hashed Message Authentication Code (HMAC) to the pair of tokens sent by the user agent 110. The PSAP 130 then returns the result of the function. The user agent 110 performs the same function on the same pair of tokens to obtain a local result. If the local result matches the result returned by the PSAP, the PSAP is authenticated.

Figure 5:
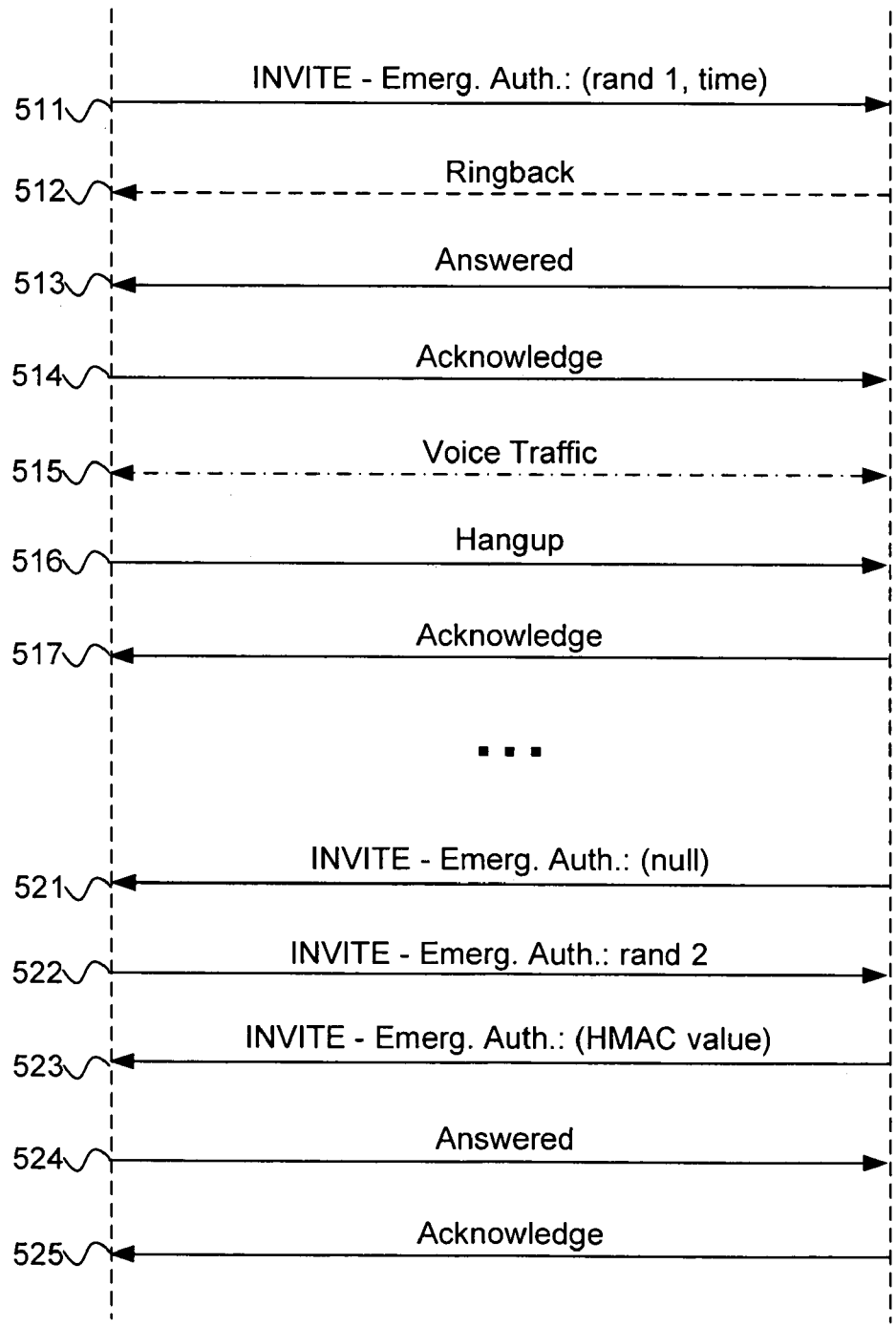
FIG. 5 illustrates another method of authenticating a call from a Public Safety Answering Point (PSAP) according to another embodiment of the present invention.

An exemplary messaging sequence according to SIP for this embodiment is illustrated in FIG. 5. The user agent 110 sends 511 a communications message such as an INVITE— Emerg. Auth. to PSAP 130. This message includes a token chosen by user agent 110, such as a random number and a time, e.g., (rand 1, time). PSAP 130 then optionally sends 512 a ringback. PSAP 130 then sends 513 an Answered message indicating that it has answered the call. User agent 110 then sends 514 an Acknowledge message to confirm that it received the Answered message. Voice traffic then commences 515 between the user agent 110 and the PSAP 130. User agent 110 may then send 516 a Hangup message to PSAP 130, thereby terminating the connection. After this, PSAP 130 sends 517 an Acknowledge of the hangup.

If PSAP 130 subsequently wishes to contact user agent 110, it sends 521 an INVITE message. User agent 110 then sends 522 an INVITE message including a second token, such as a second random number, e.g., (rand 2). PSAP 130 then applies a function such as a Hashed Message Authentication Code (HMAC) to the pair of tokens sent by the user agent 110. PSAP 130 then sends 523 the result of the function, e.g., (HMAC value) to user agent 110 using another INVITE message. User agent 110 applies the same function to the same tokens to produce a local result. User agent 110 authenticates the PSAP 130 when it confirms that the local result matches the result sent 523 by PSAP 130. In such case, user agent 110 sends 524 an Answered message to PSAP 130, after which PSAP 130 sends 525 an Acknowledge back to user agent 110. A description of the HMAC method can be found in Internet Engineering Task Force RFC 2104, which is incorporated by reference herein in its entirety.

While in the foregoing exemplary embodiments have been described in terms of specific communications messages, it is appreciated that many other message sequences are possible, according to SIP or other communications protocols, without departing from the method of the invention. It is further appreciated that additional entities may participate in the methods described without departing from the spirit of the invention. For example, a proxy, e.g., a proxy server, may serve as an intermediary between user agent 110 and PSAP 130. Such a proxy may interpret, and, if necessary, rewrite, the messages described before forwarding them to user agent 110 or PSAP 130.

The algorithms presented herein are not inherently related to any particular computer, communications device or other apparatus. An apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Various general purpose systems may be used with programs in accordance with the teachings herein, or it may prove convenient to construct more specialized apparatus to perform the required method steps. In addition, the present invention is not described with reference to any particular programming language. It will be appreciated that a variety of programming languages may be used to implement the teachings of the invention as described herein.

Advantages of the present invention include an apparatus and method for authenticating electronic communications from a party such as a PSAP. The method of the invention provides an efficient means of authentication without need for a certificate authority or other authority. The method is applicable to emergency communications scenarios such as 911 communications from a mobile communication device, where a PSAP may need to track the location of the mobile communication device to ensure that emergency service is rendered to the appropriate location.

The features, advantages and applications described in the specification are not all inclusive and, in particular, many additional features, advantages and applications will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Those of skill in the art will appreciate additional alternative designs for a system and a method for Token Distribution in Session for Future Polling or Subscription. Thus, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. In an electronic communication system for emergency 911 communications, a method of authenticating a party upon callback from the party, the method comprising:
   sending a first communication to the party, the first communication initiating a first connection with the party and including a first token;
   sending a second communication to the party, the second communication terminating the first connection with the party;
   receiving a third communication from the party, the third communication initiating a second connection and including a second token; and
   authenticating the party in accordance with a match between the first token of the first communication to the party and the second token of the third communication received from the party.

2. The method of claim 1, wherein the first and second tokens are random numbers.

3. The method of claim 1:
   wherein the first token is encrypted before it is sent, the encryption performed in accordance with a public key of the party;
   wherein the received second token is a signed second token determined in accordance with a private key of the party and further in accordance with a decryption of the sent first token; and
   further comprising decrypting the received second token to yield the second token.

4. The method of claim 3, wherein the first and second tokens comprise a random number and a time.

5. In an electronic communication system for emergency 911 communications, a method of authenticating by a user agent a communication from a party, the method comprising:
   sending a first communication to the party, the first communication initiating a first connection with the party and including a first token;
   sending a second communication to the party, the second communication terminating the first connection with the party;
   receiving a third communication from the party, the third communication initiating a second connection;
   sending a fourth communication to the party, the fourth communication including a second token;
   receiving a first result from the party, the first result determined by a function performed on the first and second tokens by the party;
   performing the function on the first and second tokens by the user agent to produce a second result; and
   authenticating the party when the first and second results match.

6. The method of claim 5, further comprising the step of sending a confirmation to the party when the first and second results match.

7. The method of claim 5, wherein the function is a hashed message authentication code function.

8. The method of claim 5, wherein the first token comprises a first random number and a time, and the second token comprises a second random number.

9. In an electronic communication system for emergency 911 communications, an apparatus for authenticating a party upon callback form the party, the apparatus comprising:
   a transmitter module configured to:
      send a first communication to the party, the first communication initiating a first connection with the party and including a first token, and
      send a second communication to the party, the second communication terminating the first connection with the party;
   a receiver module, configured to receive a third communication from the party, the third communication initiating a second connection and including a second token; and
   a control module, configured to authenticate the party when the first and second tokens match.

10. The apparatus of claim 9, wherein the first and second tokens are random numbers.

11. The apparatus of claim 9, wherein the control module is further configured to: encrypt the first token before it is sent, the encryption performed in accordance with a public key of the party, and
   decrypt the received second token to yield the second token, the received second token being a signed second token determined in accordance with a private key of the party and further in accordance with a decryption of the sent first token.

12. The apparatus of claim 11, wherein the first and second tokens comprise a random number and a time.

13. In an electronic communication system for emergency 911 communications, an apparatus for authenticating a communication from a party, the apparatus comprising:
   a transmitter module configured to:
      send a first communication to the party, the first communication initiating a first connection with the party and including a first token,
      send a second communication to the party, the second communication terminating the first connection with the party, and
      send a third communication to the party, the third communication including a second token;
   a receiver module, configured to:
      receive a fourth communication from the party, the fourth communication initiating a second connection with the party;
      receive a fifth communication from the party, the fifth communication including a first result determined by a function operating on the first and second tokens; and
   a control module, configured to:
      perform the function on the first and second tokens to produce a second result, and
      authenticate the party in response to the first and second results matching.

14. The apparatus of claim 13, wherein the transmitter module is further configured to send a confirmation to the party when the first and second results match.

15. The apparatus of claim 13, wherein the function is a hashed message authentication code function.

16. The apparatus of claim 13, wherein the first token comprises a first random number and a time, and the second token comprises a second random number.

17. In an electronic communication system for emergency 911 communications, an apparatus for authenticating a party, the apparatus comprising:
   means for sending a first communication to the party, the first communication initiating a first connection with the party and including a first token;
   means for sending a second communication to the party, the second communication terminating the first connection with the party;

means for receiving a third communication from the party, the third communication initiating a second connection and including a second token; and means for authenticating the party when the first and second tokens match.

18. The apparatus of claim 17, wherein the first and second tokens are random numbers.

19. The apparatus of claim 17, further comprising:

means for encrypting the first token before it is sent, the encryption performed in accordance with a public key of the party;

means for decrypting the received second token, which is a signed second token determined in accordance with a private key of the party and further in accordance with a decryption of the sent first token; and means for decrypting the received second token to yield the second token.

20. The apparatus of claim 19, wherein the first and second tokens comprise a random number and a time.

21. In an electronic communication system for emergency 911 communications, an apparatus for authenticating a party, the apparatus comprising:

means for sending a first communication to the party, the first communication initiating a first connection with the party and including a first token;

means for sending a second communication to the party, the second communication terminating the first connection with the party;

means for receiving a third communication from the party, the third communication initiating a second connection;

means for sending a fourth communication to the party, the fourth communication including a second token;

means for receiving a first result from the party, the first result determined by applying a function to the first and second tokens;

means for performing the function on the first and second tokens to produce a second result; and means for authenticating the party when the first and second results match.

22. The apparatus of claim 21, further comprising means for sending a confirmation to the party when the first and second results match.

23. The apparatus of claim 21, wherein the function is a hashed message authentication code function.

24. The apparatus of claim 21, wherein the first token comprises a first random number and a time, and the second token comprises a second random number.

* * * * *